United States Patent [19]

Anderson

[11] 3,741,406
[45] June 26, 1973

[54] FRICTION DRAFT GEAR
[75] Inventor: David G. Anderson, Evanston, Ill.
[73] Assignee: Miner Enterpirses, Inc., Chicago, Ill.
[22] Filed: June 22, 1971
[21] Appl. No.: 155,542

[52] U.S. Cl. .................. 213/22, 213/22, 213/40
[51] Int. Cl. ............................................ B61g 9/10
[58] Field of Search ................. 213/22, 29, 31, 32,
213/34, 40

[56] References Cited
UNITED STATES PATENTS

| 2,257,306 | 9/1941 | Olander | 213/32 R |
|---|---|---|---|
| 2,399,110 | 4/1946 | Geiger | 213/32 A |
| 1,955,393 | 4/1934 | Spence | 213/22 |
| 3,491,898 | 1/1970 | Suckow | 213/22 |
| 2,686,601 | 8/1954 | Andrews | 213/34 |
| 3,348,633 | 10/1967 | Allan | 213/32 R |
| 3,468,432 | 9/1969 | Baillie | 213/22 |
| 1,510,299 | 9/1924 | Brenne | 213/32 A |
| 1,862,764 | 6/1932 | O'Connor | 213/32 A |

Primary Examiner—Drayton E. Hoffman
Attorney—Edward F. Jurow and Clifford A. Dean

[57] ABSTRACT

A friction draft gear having a housing closed at one end, resilient means in the housing, and a friction clutch in the open end of the housing which is adapted to provide both a relatively smooth or constant friction action and a highly efficient, substantially square-wave work curve. The friction clutch has a friction bore with an inward taper which may vary from a few degrees to zero degrees, at least one set of friction shoes disposed circumferentially in the friction bore, non-metallic friction material disposed intermediate the friction shoes and the friction bore, and a wedge member engageable with the friction shoes and adapted to receive impact forces.

8 Claims, 8 Drawing Figures

DAVID G. ANDERSON
INVENTOR by Edward N. Jurow

ATTORNEY

FRICTION DRAFT GEAR

BACKGROUND OF THE INVENTION

1. Field of the Invention

My present invention pertains to a friction draft gear utilized in a coupler-yoke assembly of a railroad car which serves to absorb a substantial portion of the shock forces developed during normal train operation and particularly during humping or train make-up operations whereby to protect the car structure and to reduce lading damage within the railroad car.

2. Description of the Prior Art

Commercially successful and acceptable friction draft gears presently used in the railroad industry have been characterized, in most instances, by a heavy cast housing having either a fixed or removable rear wall at one end and an inwardly tapered friction bore at the open end, resilient means disposed within the housing in the form of coil springs, rubber pads, hydraulic units, etc., a series of metallic friction shoes or friction plates disposed in the friction bore and movable against the resilient means upon actuation of the draft gear, and a wedge member adapted to receive the high-force impact blows and disposed in frictional engagement with the friction shoes or plates in a manner such that both axial and radial forces are exerted thereon.

In friction draft gears of this type, the frictional characteristics resulting from the friction forces developed between the metal shoes and the tapered friction bore are such that the work curve developed during impact is characterized by a gradually rising curve on a force-travel graph, clearly not as efficient a work curve as would be desired.

Another problem inherent in these friction draft gears is the slip-and-grab action of the metallic friction shoes or plates relative to the tapered friction bore, which action results in undesirable "chattering" of the draft gears during actuation thereof. Numerous attempts have been made to solve this problem including "greasing" the friction bore by providing a thin layer of soft metal, such as lead, between the friction bore and the friction shoes. This attempted solution, however, has not proved to be fully satisfactory.

SUMMARY OF THE INVENTION

My present invention is concerned with a friction draft gear of the general type described herein wherein the friction bore may have a zero degree taper and wherein the surfaces of the friction shoes disposed against the friction bore are of non-metallic friction material. More specifically, the non-metallic friction surfaces of the friction shoes of my present invention are formed of a highly compressed impregnated woven-asbestos-cloth friction material. The friction shoes may either be formed wholly of this friction material or have liners of this friction material secured to the outer surfaces thereof.

With the friction draft gear of my present invention, the force builds up almost immediately upon impact with the resulting force-travel or work curve being substantially rectangular or of square-wave configuration whereby to provide a clear indication of the substantially increased efficiency of the friction draft gear of my present invention.

The frictional forces developed between the non-metallic friction surfaces of the friction shoes and the zero-taper friction bore in the friction draft gear of my present invention are substantially continuous or constant as compared to the slip-and-grab friction action of heretofore known friction draft gears. Thus, the friction draft gear of my present invention substantially eliminates the problem of undesirable "chattering" of the draft gear during operation thereof. My draft gear may be described, therefore, in a manner of speaking as a "constant friction" draft gear.

If a greater shock absorbing capacity should be desired, two or more axially spaced sets of friction shoes having non-metallic friction surfaces may be provided in the friction bore.

The zero-taper friction bore concept of the friction draft gear of my present invention is contrary to all of the previous teachings and practices in the friction draft gear art where for so many years it has been felt that, for proper operation of the friction clutch portion of a friction draft gear, it was absolutely necessary to provide at least some degree of inward taper for the friction bore end of the draft gear housing. My zero-taper concept permits the fabrication of highly efficient, high capacity friction draft gears which are much more economical to produce than the friction draft gears heretofore known. In the past, it has been the practice to produce friction draft gear housings by casting same using rather sophisticated molds and cores to provide the tapered friction bore, whether hexagonal, rectangular or circular in configuration. Utilizing my zero-taper concept, a housing for a friction draft gear having a circular, zero-taper friction bore may be fabricated very economically by merely welding a back plate or rear wall to one end of a length of steel tubing having the desired diameter, thickness and length. It is then only necessary to assemble in this housing the desired resilient means (coil springs, rubber pads, etc.); a follower plate, if necessary; one or more sets of friction shoes having non-metallic friction surfaces; a wedge member; and a center bolt, or other suitable means, for retaining the friction draft gear in assembled relationship.

DESCRIPTION OF THE PREFERRED EMBODIMENTS

Figure 1:
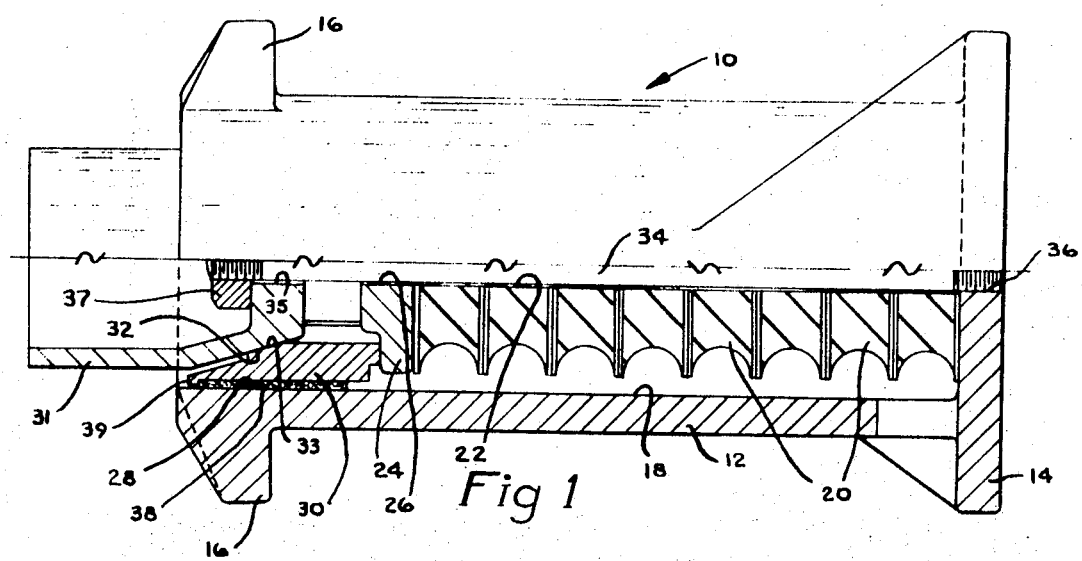
FIG. 1 is a plan view, partially in horizontal section, of one preferred embodiment of a friction draft gear of my present invention.
Figure 3:
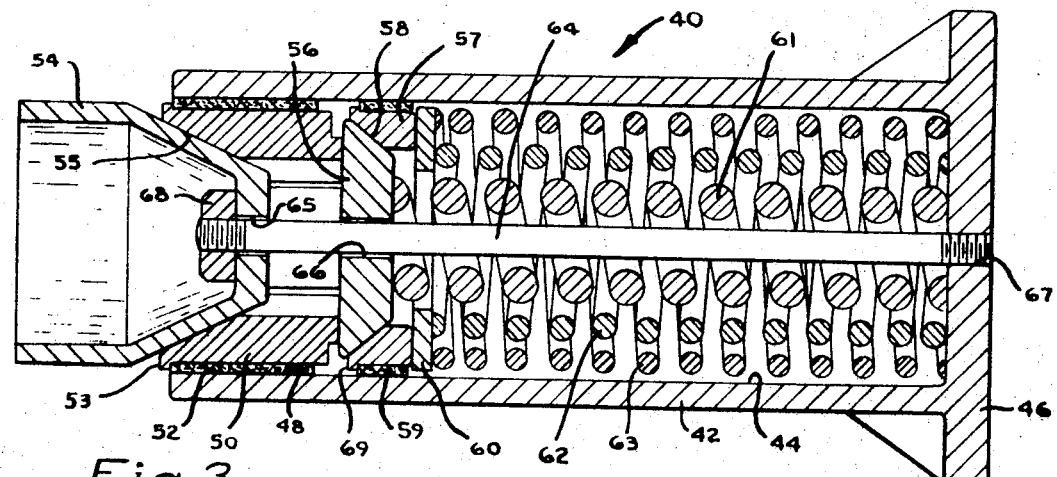
FIG. 3 is a horizontal sectional view of another preferred embodiment of a friction draft gear of my present invention.
Figure 5:
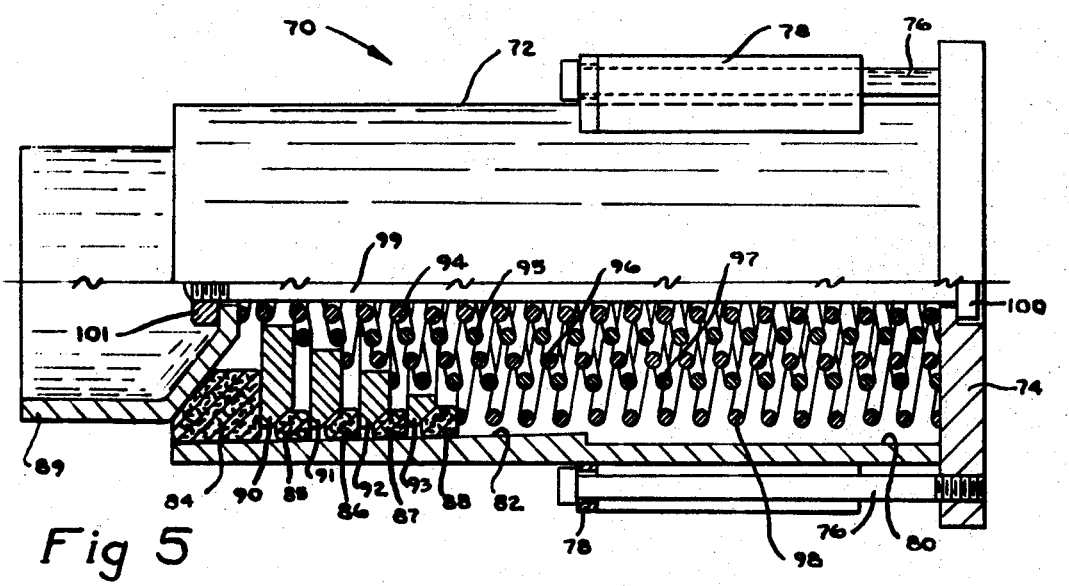
FIG. 5 is a plan view, partially in horizontal section, of still another preferred embodiment of a friction draft gear of my present invention.

Referring now to FIGS. 1, 3 and 5, there are indicated generally by the reference numerals, 10, 40 and 70, respectively, three friction draft gears incorporating the principles of my present invention.

The friction draft gear 10 includes a generally cylindrical housing 12 having a fixed rear wall 14 closing one end thereof. The open end of the housing 12 is provided with a pair of external lugs 16 which project radially outwardly therefrom whereby to accommodate a short yoke of a type well known in the art as well as the standard type yoke which extends around the rear wall 14 in a known manner.

The housing 12 is provided with an inner bore 18 which is circular in transverse cross-section from the open end of the housing 12 to the rear wall 14. Resilient means, in the form of a stack of circular rubber or rubber-like pads 20 of a type well known in the draft gear art, is provided in the housing 12 seated against the rear wall 14. The pads 20 are provided with central openings 22 for a purpose which will be obvious hereinafter. In the embodiment of the invention shown in FIGS. 1 and 2, a stack of eight pads 20 is used.

Disposed against the outer end of the stack of pads 20 is a circular follower plate 24 which is also provided with a central opening 26 which is in alignment with the openings 22 in the stack of pads 20.

Figure 2:
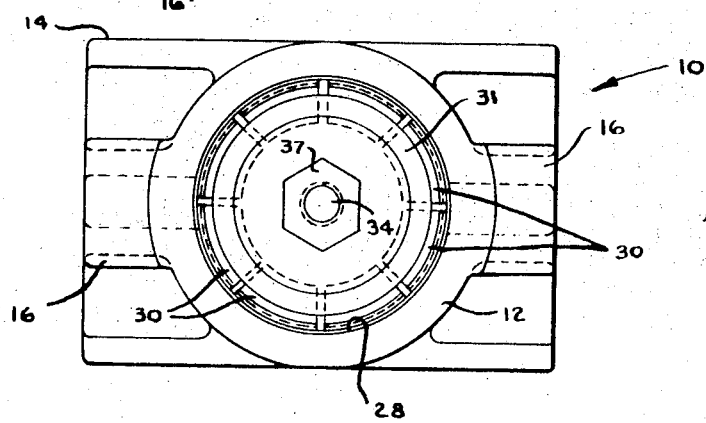
FIG. 2 is an end elevational view of the friction draft gear of FIG. 1.

The friction clutch of the friction draft gear 10 of FIGS. 1 and 2 is characterized by a friction bore 28 at the open end of the housing 12, by a series or set of friction shoes 30 disposed circumferentially about the friction bore 28 with their inner ends seated against the outer face of the follower plate 24, and by a cup-like wedge member 31 having an inclined or conical outer surface 32 disposed in frictional engagement with inner inclined surfaces 33 of the friction shoes 30 in a manner well known in the friction draft gear art.

The friction draft gear 10 is retained in assembled relationship as shown in FIG. 1 by a center retaining bolt 34 which extends through the openings 22 in the pads 20, the opening 26 in the follower plate 24, and a central opening 35 which is provided in the inner end of the wedge member 31. One end of the retaining bolt 34 is threadedly secured in the rear wall, as at 36, and a nut 37 is threadedly secured on the opposite end of the retaining bolt 34 for engagement with the inner surface of the inner end of the wedge member 31.

Heretofore, it has been considered that friction draft gears were required, for proper operation, to have a friction bore that tapered inwardly, at least a few degrees, toward the axis of the gear housing in the direction of the rear wall thereof. The friction bore 28 of the friction draft gear 10 shown in FIGS. 1 and 2 is circular in transverse cross-section and has a zero degree taper relative to the longitudinal axis of the housing 12.

Although eight friction shoes 30 are provided in the friction draft gear 10 of FIGS. 1 and 2, a lesser or greater number may be used, as desired. Another novel feature of my present invention is the provision of a substantially non-metallic friction material between the friction bore of a draft gear housing and the friction shoes movable relative thereto. This feature may take the form of providing the friction bore with a liner of such friction material and using all-metal friction shoes, of providing friction shoes formed wholly of such friction material (See FIGS. 5 and 6) for use in a metallic friction bore, or by bonding, or otherwise securing, liners of such friction material on the outer surfaces of metalic friction shoes which are in sliding or frictional engagement with a metallic friction bore (See FIGS. 1, 3 and 4).

One such friction material which has been found to be very satisfactory is commercially available from Raybestos-Manhattan, Inc. and is designated in its catalog as U.S.-6232. This particular friction material is a highly compressed impregnated woven-asbestos-cloth friction material which is formed by a dry mold method. The woven asbestos yarns in this material are relatively long and contain a substantial percentage of copper whereby the end product has a dry coefficient of friction in the order of 0.48 and is extremely durable. This friction material can withstand up to 40,000 psi in compression and about 7,000 psi in shear, and has a modulus of elasticity in the range of about 63,000 psi to 133,000 psi.

In the friction draft gear 10 shown in FIGS. 1 and 2, the friction shoes 30 are each provided with a liner 38 formed of a substantially non-metallic friction material, such as has been described herein. The friction liners 38 are secured to the outer surfaces of the friction shoes 30 by any suitable means, such as by bonding with a suitable epoxy, whereby the liners 38 are in frictional engagement with the metallic zero-taper friction bore 28 of the housing 12. The outer ends of the friction shoes 30 may be provided with a slight outwardly turned flange portion or shoulder 39 against which the outer end of the liners 38 may be seated.

Operationwise, the friction draft gear 10 of FIGS. 1 and 2 operates in a manner very similar to friction draft gears known in the art. When an impact forces the wedge member 31 inwardly of the housing 12, both axial and radial force vectors are imposed on the friction shoes 30 by the wedge member 31 with the axial-inward movement of the friction shoes 30 being opposed by the pads 20. A substantial portion of the input energy is dissipated through the heat generated by the friction developed, with the portion of the input energy stored by the compressed pads serving to return the parts of the gear to its normal condition upon release of the input force.

However, my zero taper friction bore and my provision of a non-metallic friction material intermediate the friction shoes and the friction bore produce results heretofore unknown in commercially accepted friction draft gears. My present design of a friction draft gear incorporating the foregoing features substantially eliminates the undesirable chattering which is so often noticeable during the operation of presently known friction draft gears having metal friction shoes working in a metallic tapered friction bore. This chattering is a result of the "slip-and-grab" action of the metal shoes in the metallic tapered friction bore. Thus, the friction draft gear of my present invention may be described, in a manner of speaking, as a continuous or constant friction draft gear.

Figure 8:
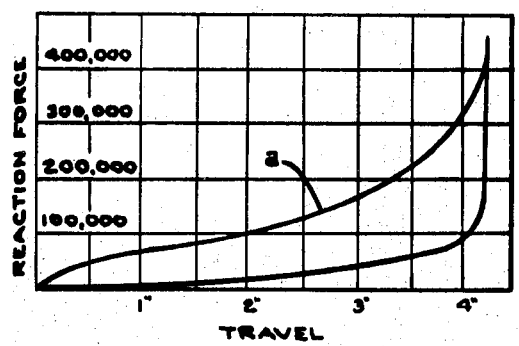
FIG. 8 is a force-travel graph depicting a typical work characteristic curve of a friction draft gear of presently known types during impact.

Further, in presently known friction draft gears, the work curve produced by such gears during operation, as recorded by an oscilloscope or other test instruments, indicates a rather gradual rise in reaction force during inward travel of the wedge. A typical work curve a for friction draft gears heretofore commercially acceptable is charted on the graph shown in FIG. 8 wherein reaction force is plotted along the ordinate and wedge travel is plotted along the abscissa.

Figure 7:
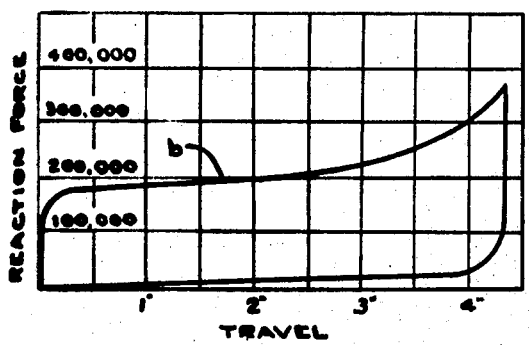
FIG. 7 is a force-travel graph depicting an actual work characteristic curve of the friction draft gear shown in FIG. 1 during impact.

In comparison, a work curve b shown on a similar graph in FIG. 7 is an actual result of a drop-hammer test of the friction draft gear 10 shown in FIGS. 1 and 2. It is noted that, in this test, the reaction force builds up almost immediately and produces what may be referred to as a "square wave" work curve. With the area encompassed by the curve indicating the impact energy dissipated during operation of the friction draft gear, it is evident, in comparing curves a and b that the friction draft gear of my present invention is much more efficient than those heretofore known in the art. More specifically, the curve b in FIG. 7 is the result of a 22 inch test drop of a 27,000 pound drop hammer on the friction draft gear 10 shown in FIGS. 1 and 2 with the curve b indicating a shock-absorbing capacity of approximately 60,000 foot-pounds at a reaction force of 350,000 pounds and a wedge travel of approximately 4.31 inches.

It has been the practice in the manufacture of friction draft gears to cast the housings with the tapered friction bores formed therein. As a result of my zero taper friction bore concept, friction draft gear housings may be fabricated much more economically either by casting same with less sophisticated molds and cores or by simple metal fabrication. For instance, a housing for a friction draft gear having a circular, zero taper friction bore may be fabricated very economically by merely welding, or otherwise securing, a back plate or rear wall to one end of a length of steel tubing having the desired diameter, thickness and length.

It is further noted that the zero-taper friction bore concept permits the use of coil springs, rubber pads, etc. of a greater diameter as same need not be assembled into the draft gear housing past a reduced inner-diameter bore at the inner end of a conventional tapered friction bore.

The friction draft gear 40 shown in FIG. 3 is similar to the friction draft gear 10 shown in FIGS. 1 and 2 in that it has the zero taper friction bore and the non-metallic friction liners on the friction shoes. However, the friction draft gear 40 incorporates a two-stage cascade friction clutch which provides greater shock absorbing capacity.

Figure 4:
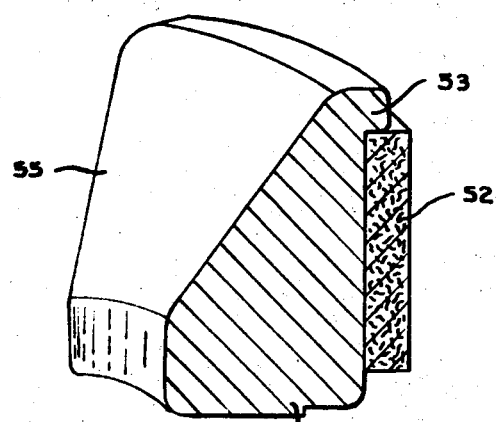
FIG. 4 is an enlarged perspective view, partially in vertical section, of a friction shoe similar to those shown in FIGS. 1 and 3 wherein the shoe is formed of metal and has a non-metallic friction liner bonded to the outer surface thereof.

As shown in FIG. 3, the friction draft gear 40 includes a generally cylindrical housing 42 having an internal bore 44 and one end closed by a rear wall 46. A zero taper friction bore 48 at the open end of the housing 42 has a first set of friction shoes 50 disposed circumferentially therein with each shoe having a non-metallic friction material liner 52 bonded, or otherwise secured, to the outer surface thereof for frictional engagement with the friction bore 48. The liners 52 are seated against shoulders 53 formed on the outer ends of the shoes 50, as best illustrated in FIG. 4. A wedge member 54 is disposed outwardly of the shoes 50 with the wedge member 54 and shoes 50 having complementary inclined friction surfaces, as at 55.

The inner ends of the shoes 50 abut against a wedge-follower 56 which is in frictional engagement with a second set of friction shoes 57 circumferentially disposed in the friction bore 48 in axially spaced relationship inwardly of the first-stage friction shoes 50. The wedge-follower 56 and the second stage friction shoes 58 have complementary inclined friction surfaces, as indicated at 58. The second-stage friction shoes 58 also have non-metallic friction material liners 59 bonded to the outer surfaces thereof and seated against shoulders 69.

The inner ends of the second-stage friction shoes 57 are seated against the outer face of an annular follower plate 60 with a pair of coil springs 62 and 63 being seated between the inner face of the annular follower plate 60 and the rear wall 46. A center coil spring 61 is seated between the inner face of the wedge follower 56 and the rear wall 46.

The friction draft gear 40 is retained in assembled relationship by an axially disposed retaining bolt 64 which has one end threadedly secured in the rear wall 46, as at 67, and which extends through the center coil spring 61, the annular follower plate 60, a central opening 66 provided in the wedge-follower 56, and through a central opening 65 provided in the wedge member 54 with a nut 68 being threadedly secured on the end thereof.

It is to be understood that the friction shoes 30, 50 and 57 shown in FIGS. 1 and 3 could also be formed wholly of the substantially non-metallic friction material described herein within the scope of my invention and the transverse cross-sectional configuration of the friction bores 28 and 48 could just as well be square, rectangular, hexagonal, etc. rather than circular. Obviously, the friction shoes would have complementary configurations.

Although the performance may not be quite as good or efficient as for the friction draft gears 10 and 40 shown in FIGS. 1, 2 and 3, it is noted that my non-metallic friction shoes may also be used in a friction draft gear having a conventional, slightly tapered friction bore, such as the friction draft gear 70 shown in FIG. 5, which draft gear is further characterized by a cascade of five friction stages.

The friction draft gear 70 shown in FIG. 5 includes a generally cylindrical housing 72 having a rear wall 74 secured to one end thereof by means of bolts 76 and brackets 78 secured to the outer surface of the housing 72. The rear wall 74 could also be welded to the end of the housing 72. The inner end of the housing 72 has a non-tapered bore 80 while the open end of the housing 72 is provided with an inwardly tapered friction bore 82, as is well known in the friction draft gear art.

Figure 6:
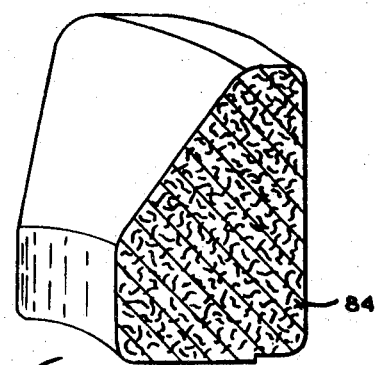
FIG. 6 is an enlarged perspective view, partially in vertical section, of a friction shoe similar to that shown in FIG. 5 wherein the shoe is formed wholly of a non-metallic friction material.

The friction draft gear 70 is provided with a primary set of friction shoes 84 and four sets of axially spaced secondary friction shoes 85, 86, 87 and 88, respectively. As is best illustrated in FIG. 6, all of the friction shoes 84, 85, 86, 87 and 88 are formed wholly of a substantially non-metallic friction material, such as the friction material previously described herein.

The primary friction shoes 84 are operably engaged by a wedge member 89 with the remaining sets of friction shoes 85, 86, 87 and 88 being separated and operably engaged by annular wedge-followers 90, 91, 92 and 93, respectively. Inward movement of the foregoing wedge members and friction shoes is opposed by a concentric set of coil springs 94, 95, 96, 97 and 98 in a conventional manner. An axially disposing retaining bolt 99 having a head 100 seated in the rear wall 74 and a nut 101 tightened on the opposite end for engagement with the wedge member 89 serves to retain the friction draft gear 70 in assembled relationship.

While I have shown and described what I believe to be several preferred embodiments of my present invention, it will be understood by those skilled in the art that various rearrangements and modifications may be made therein without departing from the spirit and scope of my invention.

I claim:

1. In a high-capacity, single action spring-friction draft gear for couplers of railway rolling stock, said draft gear being of the type having a capacity in excess of 36,000 ft. lbs. at a wedge travel of 3¼ inches and with a reaction force less than 500,000 lbs., and comprising an elongated hollow metallic housing closed at one end and open at the other end, resilient means within and in contact with the closed end of the housing, a wedge member adjacent the open end of the housing and extending outwardly therefrom and interacting along inclined surfaces with a plurality of radially movable friction members arranged inside of and in engagement with the housing, and means for retaining the draft gear in assembled relationship, the improvement wherein to increase the effectiveness of operation of the draft gear the friction members have a housing-engaging-surface of a friction material having a modulus of elasticity in the range of about 63,000 psi to 133,000 psi and which can withstand up to 40,000 psi in compression and about 7,000 psi in shear whereby the draft gear has impact energy dissipating efficiency in excess of 85 percent and the force-travel curve during impact is substantially of square wave configuration.

2. A draft gear according to claim 1 wherein the improvement further comprises providing either the inclined surface of the wedge or the corresponding mating surface of the friction member with said friction material.

3. A draft gear according to claim 1 wherein the improvement further comprises said friction members having surfaces of said friction material engaging both the inclined wedge surface and the inside surface of the housing.

4. A draft gear according to claim 1 wherein the improvement further comprises said friction members consisting solely of said friction material.

5. A draft gear according to claim 1 wherein the improvement further comprises said friction material including a compressed impregnated asbestos cloth.

6. A draft gear according to claim 5 wherein the improvement further comprises said asbestos cloth being formed by the dry mold method and including relatively long asbestos fibers and an appreciable amount of copper.

7. A draft gear according to claim 6 wherein the improvement further comprises said friction material having a dry coefficient of friction of the order of 0.48.

8. A draft gear according to claim 1 wherein the improvement further comprises said housing having a zero degree taper.

* * * * *